United States Patent [19]

Schirmann et al.

[11] Patent Number: 4,656,308

[45] Date of Patent: Apr. 7, 1987

[54] ETHERS OF ACRYLAMIDOGLYCOLIC ACID AND ESTERS

[76] Inventors: Peter J. Schirmann, Fairfield; Werner J. Blank, Wilton; Girish G. Parekh, all of Fairfield, Conn.

[21] Appl. No.: 772,592

[22] Filed: Sep. 5, 1985

Related U.S. Application Data

[60] Continuation of Ser. No. 556,077, Dec. 1, 1983, abandoned, which is a continuation of Ser. No. 346,329, Feb. 5, 1982, abandoned, which is a continuation of Ser. No. 148,105, May 9, 1980, abandoned, which is a division of Ser. No. 43,522, May 29, 1979, abandoned.

[51] Int. Cl.$^4$ ............................................. C07C 103/66
[52] U.S. Cl. ..................... 560/170; 560/147; 560/169; 560/171; 560/174; 560/183; 560/185; 562/567; 526/304
[58] Field of Search ............ 560/11, 41, 82, 149, 560/170, 174, 181, 185; 526/304; 562/567

[56] References Cited

U.S. PATENT DOCUMENTS

| | | | |
|---|---|---|---|
| 2,599,549 | 6/1952 | Fisher et al. | 560/185 |
| 2,701,809 | 2/1955 | Plaut | 260/404 |
| 2,978,450 | 4/1961 | Reppe et al. | 560/82 |
| 3,150,118 | 9/1964 | Clemens | 526/318 |
| 3,178,385 | 4/1965 | Dinges et al. | 427/341 |
| 3,285,886 | 11/1966 | Gunderson et al. | 564/208 |
| 3,422,139 | 1/1969 | Talet et al. | 562/567 |
| 4,058,508 | 11/1977 | Naarmann et al. | 526/218 |
| 4,078,015 | 7/1978 | Leitheiser et al. | 560/24 |

FOREIGN PATENT DOCUMENTS

| | | |
|---|---|---|
| 1103916 | 2/1968 | United Kingdom . |
| 1108383 | 4/1968 | United Kingdom . |
| 1242980 | 8/1971 | United Kingdom . |
| 1461750 | 1/1977 | United Kingdom . |

OTHER PUBLICATIONS

*Chemical Abstracts* vol. 74 (1971) #54,229c.
*Chemical Abstracts* vol. 75 (1971) #50,182e.
*Chemical Abstracts* vol. 63 #11,822e.
Inukai, Yoshihiko *Chemical Abstracts* vol. 77 (1972) #89,073m.
Owen L. N. et al. *Chemical Abstracts* vol. 44 (1950) #4861i.
Wenkert, Ernest et al. *J. Am. Chem. Soc.* vol. 86 (1964) pp. 2038-2043.
Schoberl, Alfons et al., *Liebigs Ann. Chem.* vol. 716 (1968) pp. 37-46.
Schnabel, Horst W. et al. Liebigs Ann. Chem. (1974) pp. 477-495.

*Primary Examiner*—Natalie Trousof
*Assistant Examiner*—L. Hendriksen

[57] ABSTRACT

Ethylenically unsaturated monomers containing activated ester groups are used to make polymers and copolymers which are useful in coatings, adhesives and moldings.

3 Claims, No Drawings

ETHERS OF ACRYLAMIDOGLYCOLIC ACID AND ESTERS

This is a continuation of application Ser. No. 556,077, filed Dec. 1, 1983, now abandoned, which is a continuation of application Ser. No. 346,329, filed Feb. 5, 1980, now abandoned, which was in turn a continuation of application Ser. No. 148,105, filed May 9, 1980, now abandoned, which was in turn a divisional of application Ser. No. 043,522, filed May 29, 1979, also abandoned.

This invention relates to ethylenically unsaturated monomers which contain activated ester groups. These monomers are used to prepare polymers and copolymers with other ethylenically unsaturated monomers which are useful in the preparation of coatings and adhesives for metals, woods, textiles, and paper, and in the preparation of moldings. The resultant polymers and copolymers are readily cross-linked by reaction with compounds containing at least two primary or secondary amine groups, and the present invention further relates to the resultant cross-linked product.

Previously attempts at preparing coatings had centered on using commercially available polymers and developing novel crosslinking agents for use therewith, i.e., U.S. Pat. Nos. 3,519,627 and 4,026,855 for example, as well as U.S. Ser. No. 32,982 of the present inventors.

Alternatively, prior attempts to prepare polymers, useful with conventional diamines, had been directed to isocyante and/or epoxide technology. However, these coatings have considerable drawbacks to their commercial use in that the ingredients are highly toxic, or are difficult to handle, or cannot be tailor-made to a sufficient degree to make a family of coatings useful for multiple purposes.

U.S. Pat. No. 3,422,139 describes the use of acrylamidoglycolic acid as a comonomer useful in coatings.

Although the use of activated esters in the preparation of regular copolyamides is well known in the literature, c.f. Ogata et al. (Polymer Journal at Vol. 5, p. 186–194, Vol. 6, p. 412–418, Vol. 7, p. 72–78, and Vol. 10, p. 499–504; J. Polymer Science Vol. 14, p. 783–792; and others), these compounds were copolymerized through the ester groups. There has been no attempt to produce monomers wherein the activated ester remains available for subsequent crosslinking with commercially available polyamines.

Accordingly, it is an object of the present invention to produce ethylenically unsaturated monomers containing activated ester groups.

It is a further object to produce polymers of the monomers and copolymers thereof with ethylenically unsaturated compounds.

It is a further object to produce coatings containing the polymers or copolymers and compounds containing at least two primary or secondary amine groups.

And it is a still further object to produce crosslinked coatings therefrom.

These and other objects will be apparent from the disclosure.

The monomers of the present invention contain a polymerizable ethylenically unsaturated group, i.e., a vinyl group, and an activated ester group.

Suitable monomers contain the group —X—COOR wherein X is selected from —OCH$_2$,

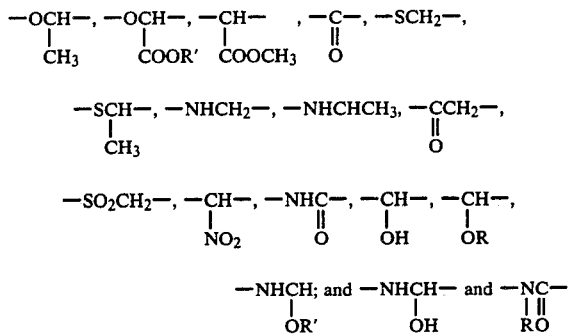

wherein R is an aliphatic moiety and each R' is alkyl of 1–8 carbon atoms.

This —X—COOR group may be either directly linked to the group containing a polymerizable vinyl linkage or it may be linked through a bridging unit. The nature of this bridging unit has been found to have essentially no influence on the reactivity of the ester groups on the monomers of the present invention. Thus, the use of a bridging unit and/or the particular unit is basically one of convenience in preparing the monomers.

If a bridging unit is used, it must be an organic group which is attachable to both the group containing the vinyl linkage and the activated carboxylic ester group. It further must be stable so as to not degrade during further processing and/or use of the compound.

Examples of suitable bridging units include such as —OCH$_2$CH$_2$—, —OCH(CH$_3$)CH$_2$—, —OCH$_2$CH$_2$OCH$_2$CH$_2$—, —OCH$_2$CH$_2$CO—, —NHCH$_2$—, —NH—, and —NHCOCH$_2$CH$_2$—. Any other suitable group may be used.

Accordingly, the monomers herein have the structure:

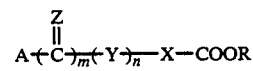

wherein A is a group containing a polymerizable vinyl linkage; Z is O or S; m and n are each 0 or 1; Y is the bridging unit as defined above; X is as defined above; and R is an aliphatic moiety.

The exact nature of R which acts as a leaving group during crosslinking of the resultant coating by the action of an amine, has been found to be relatively insignificant so long as it is not too bulky to prevent the approach of the amine. Preferably, R is an alkyl group with 1–8 carbon atoms, a cycloalkyl group with 5–8 carbon atoms, or a cycloheteroalkyl group containing 5–8 atoms in the ring. These groups may be substituted with heteroatoms, NO$_2$ groups, ethers, halogens, alcohols, nitriles, and amides. Thus, R may derive from alcohols such as methanol, ethanol, propanol, 2-nitroethanol, 2-chloroethanol, 2-cyanoethanol, ethyleneglycol, propyleneglycol, monoalkoxyethanols, furfuryl alcohol, tetrahydrofurfuryl alcohol, tetrahydropyran-2-methanol, tetrahydropyran-3-ol, thioethanol and other similar compounds. Most preferably R is selected from methyl, ethyl, propyl, isopropyl, butyl, isobutyl, t-butyl, optionally containing a hydroxyl group.

The C=Z group may be present or absent depending upon the starting compound which is converted into the activated ester monomer herein. When C=Z is present, A is generally a group such as acryl or methacryl. When C=Z is not neede to make the monomer, A is such as styryl.

Suitable monomers within the scope of the present invention include such as:
Methyl acrylamidoglycolate
Methyl acrylamidoglycolate methyl ether
Methyl methacryloxyacetate
Ethyl acrylamido-N-oxalate (N-ethyloxalyl acrylamide)
N,N'-Bis(ethyloxalyl)acrylamide
N-isopropyl, N-ethyloxalyl-3-propylamino methacrylamide
N-Ethyloxalyl-N'-methyleneaminoacrylamide
Ethyl N-2-ethyloxamatoacrylate
Ethyl 3-pyruvylacrylate
Ethyl methylenepyruvate
Methyl acrylthiocarbonyloxyacetate (Methyl thiacryloxyacetate)
Methyl thiacrylthioglycolate
Methyl acryl-2-thioglycolate
Methyl thiacrylamidoacetate
Methyl acrylamidoglycolate thioether
Methyl acrylamido-N-methylenethioglycolate
p-Ethyl oxalyl styrene.

Other alkyl groups may be substituted for the methyl or ethyl groups in the above-named compounds.

The activated ester monomers herein may be prepared by standard synthetic methods well known to the art such as esterification, condensation, addition, elimination and other such reactions depending upon the particular monomer to be prepared. The reactions are carried out using conventional acidic or basic catalysts as needed and under conventional reaction conditions. For example, the alkylacrylamidoglycolate alkyl ethers may be prepared by esterifying and etherifying acrylamidoglycolic acid with the desired alcohol or mixture of alcohols; alkyl acryloxyacetates may be prepared by condensing an amine salt of the acrylic acid and an alkyl haloacetate. Alkyl N-ω-alkylzamatoacrylate and N-alkyl-N-alkyloxalylaminoacrylamides and methacrylamides may be prepared by the condensation reaction of an appropriate acid chloride such as alkyl oxalyl chloride or acryloyl chloride with the desired alcohol or amine such as ω-hydroxyalkyloxalate or alkylaminoalkylacrylamide. Other compounds may be similarly prepared.

Optionally the monomers may be transesterified with diols such as ethylene glycol and propylene glycol.

The monomers may be polymerized, or more preferably copolymerized with other vinyl monomers, according to conventional vinyl polymerization techniques using conventional initiators, temperatures, and other reaction conditions. Suitable comonomers useful herein include the acrylates, methacrylates, styrenes, acrylonitriles, vinyl ethers, vinyl esters and derivatives of these compounds. Specifically useful are alkyl acrylates and methacrylates wherein the alkyl groups have 1–18 carbon atoms, styrene, α-methylstyrene, acrylonitrile, methacrylonitrile, acrylic acid, methacrylic acid, maleic and fumaric acids and esters, functional-containing acrylates and methacrylates such as hydroxy ethylacrylate, acrylamide, methacrylamide, and the like. Most preferably the comonomers are selected from methylacrylate, ethylacrylate, propylacrylate, butylacrylate, 2-ethylhexylacrylate, methylmethacrylate, ethylmethacrylate, butylmethacrylate, acrylic acid, methacrylic acid, maleic acid, vinyl acetate, styrene and acrylonitrile.

Generally the polymerization or copolymerization is performed in the presence of an inert organic solvent such as ethylacetate, or tetrahydrofuran, or a reactive solvent such as butanol and the like, so that in either case the resultant polymer is ready for use in a coating. The polymer must contain at least 2, and preferably 3 or more, activated ester groups per polymer chain so that crosslinking may be achieved.

The copolymers should contain about 5 to 50 percent by weight of an activated ester monomer and the balance one or more of a comonomer such as those specified above. Preferably, the copolymer contains about 10 to 40 percent of an activated ester monomer and a portion, i.e., up to about 10%, of the copolymer contains acidic functionality to catalyze the resultant curing of the polymer with a polyamine compound. Preferred acidic compounds are acrylic acid, methacrylic acid and acrylamidoglycolic acid alkyl ethers where the alkyl group has 1–8 carbon atoms.

The polymers so produced may be cured by reaction with compounds containing at least two primary or secondary amine groups per molecule at temperatures from as low as room temperature to 200° C. in a period of less than about 30 minutes, though longer times may be needed at the lower temperatures.

The primary or secondary amine groups must be available for entering into the curing reaction with the activated ester of the monomer. Generally, this means that they are pendantly attached to a compound. For purposes of this invention, pendant amine groups include terminal amine group, as well as those attached to the compound or to a side chain thereon.

Suitable compounds containing amine groups useful herein include such as:
1,2-ethylenediamine
1,3-propylenediamine
1,2-butylenediamine
1,4-butylenediamine
1,6-hexamethylenediamine
1,7-heptanediamine
diethylenetrimine
xylyldiamine
4,7-dioxadecan-1,10-diamine
1,2-diaminocyclohexane
Bis(p-aminocyclohexyl)methane
2,2-Bis(4-aminocyclohexyl)propane
N,N-Bis(3-aminopropyl)methylamine
Bis(hexamethylenetriamine)

Alternatively, the amine containing compound may be a polymer which contains at least about 1% by weight of pendant amine groups.

Representative polymers containing pendant amine groups can be derived from epoxy and epoxy-modified diglycidyl ethers of bisphenol A structures, various aliphatic polyethylene or polypropylene glycol (diglycidyl ether) adducts, and glycidyl ethers of phenolic resins, such epoxy resins being commercially available and commonly used in the electrocoating field.

Other useful polymers containing pendant amine groups include polyamide resins, for example, condensation products of dimerized fatty acids coreacted with difunctional amine, such as ethylene diamine. Polyamide resins generally are those having a molecular weight between about 500 and 5,000. Further useful polymers containing pendant amine groups include acrylic resins having molecular weight of about 1,000 to about 1,000,000 or more, polyester resins and polyurethane resins both having a molecular weight range of about 500 to about 5,000, and vinyl resins.

Generally, the cross-linking agent is used in an amount to provide a ratio of activated ester groups to amine groups of about 0.3/1 to 3/1.

Coating compositions based upon the activated ester monomer of the present invention may contain, in addition to the polymer and the polyamine curing agent, conventional coatings additives such as antioxidants, heat stabilizers, flow control agents, pigments, surface active agents, anticorrosion agents, catalysts, and solvents.

To further illustrate the present invention, the following non-limiting examples are offered wherein all parts and percents are by weight unless otherwise specified.

EXAMPLE 1

Preparation of Methyl Acrylamidoglycolate Methyl Ether (MAGME)

To a three-necked flask equipped with a stirrer and an extractor filled with a molecular sieve drying agent was added 300 parts acrylamidoglycolic acid, 3000 parts methanol, 0.05 parts phenothiazine, 4.5 parts 98% sulfuric acid and 200 parts chloroform. The mixture was heated to reflux and the distillate was allowed to pass through the extractor for 6½ hours. The mixture was cooled and allowed to stand for 16 hours at which point the mixture was warmed to about 40° C., 19 g of sodium carbonate was added, and the solution was stirred for 2½ hours. The mixture was filtered and vacuum stripped of solvent. The solid residue was extracted with chloroform. Diethyl ether was added to the extract and a polymeric mass precipitated which was discarded. The remaining extract was stripped of solvent to yield 264.2 parts of crude MAGME which was confirmed by chemical analysis.

EXAMPLE 2

Preparation of Ethyl Methyacryloxyacetate (EMA)

To a flask equipped with a stirrer was added 172.8 parts methacrylic acid and 202 parts triethylamine. This mixture was allowed to stir for 5 min. To this was added 245 parts ethyl chloroacetate. The reactants were heated to 60° C. and the exotherm carried the temperature up to 100° C. The temperature was kept between 90°–97° C. by cooling for ½ hour after which heat was supplied to hold the temperature at 90° for 1 hour. The mixture was cooled and filtered. This crude product was distilled at 65.5°–66° C. at 0.1 cm to yield 318 g of pure EMA as confirmed by chemical analysis.

EXAMPLE 3

Preparation of Butyl Acrylamidoglycolate Butyl Ether (BAGBE)

One hundred parts of acrylamidoglycolic acid (AGA); 517 parts butanol, 1 part concentrated sulfuric acid and 0.1 part monomethyl ether of hydroquinone were mixed in a flask equipped with a Dean Stark water trap and a stirrer. The mixture was heated until homogeneous. After 5–10 minutes 100 ml of toluene was added and the mixture was brought to reflux and held 5 hours until the theoretical amount of water was collected by azeotrope.

The toluene and excess butanol were removed under vacuum to yield 173 parts crude BAGBE, as confirmed by chemical analysis.

EXAMPLE 4

Preparation of Ethyl Acrylamidoglycolate Ethyl Ether (EAGEE)

Eighteen parts of acrylamidoglycolic acid (AGA), 250 parts ethanol, 0.27 parts sulfuric acid and 0.018 g of monomethylether of hydroquinone were added to a flask and the mixture was refluxed for 1½ hours. Toluene (300 parts) was added and the azeotrope was collected and tested for water content. The solvent mixture was replenished and the azeotrope collected until the theoretical amount of water was taken off (4.5 parts). The solvent was then removed under vacuum to yield 24.9 parts crude EAGEE which crystallized readily on standing and was identified by chemical analysis.

EXAMPLE 5

Preparation of Acrylamidoglycolic acid Methyl Ether (AGME)

45 parts of acrylamidoglycolic acid, 90 parts trimethylorthoformate, 0.045 parts of the mono methyl ether of hydroquinone and 35 parts of methanol are mixed in a flask equipped with a stirrer, condensor and thermometer. The mixture was heated at a bath temperature of 60°–65° C. for 24 hours. A small amount of insoluble material was filtered off and discarded. The filtrate was stripped of solvent under vacuum and a rubbery substance was obtained. This material was extracted with ether with stirring for 3 days. The solid which was insoluble in the ether was filtered off and was further extracted with acetone. The acetone was removed to yield 24 g of crude AGME (Mp. 100–102.5).

EXAMPLE 6

Following the procedure of Example 1, the following additional monomers are prepared:
Methyl acrylamidoglycolate ethyl ether
Ethyl acrylamidoglycolate methyl ether
Cyclohexyl acrylamidoglycolate cyclohexyl ether

EXAMPLE 7

Preparation of Polymer A

To a flask equipped with a stirrer, condensor, nitrogen inlet and thermometer was added 78 parts ethyl acetate as solvent, 25.5 parts butyl acrylate, 41 parts methyl methacrylate, 31 parts MAGME from Example 1, 2.5 parts acrylamidoglycolic acid methyl ether from Example 5, 2.0 parts dodecyl mercaptan, and 2.0 parts azobisisobutyronitrile catalyst. The solution was purged with nitrogen for 30 minutes and then heated to 76° C. for 2½ hours. The polymer so formed was then used in the preparation of the coatings tested below.

EXAMPLE 8

Preparation of Polymer B

The procedure of Example 7 was repeated except that tetrahydrofuran (70 parts) was used as the solvent and the following ratio of monomers were used:
30 parts butylacrylate
40 parts methylmethacrylate
30 parts MAGME

EXAMPLE 9

Preparation of Polymer C

The procedure of Example 7 was repeated using 45 parts ethyl acetate and the following ratio of monomers:
25.5 parts butylacrylate
37 parts methylmethacrylate
35 parts EMA from Example 2
2.5 parts AGME from Example 4

EXAMPLE 10

Following the procedure of Example 7, polymers are prepared from the following monomer compositions using toluene as the solvent:

| Monomer | D | E | F | G | H | I |
|---|---|---|---|---|---|---|
| Butylacrylate | 5.25 | 5.25 | 16.1 | 25 | 25.5 | 25.5 |
| Methylmethacrylate | 20.5 | 19.25 | 29.0 | 39 | — | 41.0 |
| BAGBE | 24.5 | 24.5 | — | — | — | — |
| Methacrylic acid | 1.25 | 2.5 | 1.8 | 5 | 2.5 | 2.5 |
| EAGEE | — | — | 25.0 | — | — | — |
| MAGME | — | — | — | 31 | 31.0 | 31.0 |
| Styrene | — | — | — | — | 21.0 | — |
| Acrylonitrile | — | — | — | — | 20.0 | — |

EXAMPLE 11

20 parts Polymer B, and 1.16 parts of 1,6-hexamethylene diamine were blended together. A glass tube was filled with the free flowing mixture and after about 112 minutes the mixture set up as a gel. This shows that the polymer has the capability of crosslinking with the diamine at room temperature.

The same mixture after aging for 50 minutes was cast into films on cold rolled steel and baked at 100° C./20 min. These films exhibit solvent resistant as shown in Table I.

EXAMPLE 12

To 30 parts of Polymer A was added 9.8 parts of butanol and 1.05 parts of 1,3-propylenediamine. This blend was cast into a film on Bonderite 1000 cold rolled steel panels and was shown to cure at room temperature as shown in Table I. An identical blend without the butanol placed in a glass tube showed a gel effect point of 15 minutes at room temperature.

EXAMPLE 13

To 40 parts of Polymer A was blended 4.1 parts of 1,6-hexamethylenediamine and 13 parts of butanol. The blend was cast into films as in previous examples and was shown to cure at ambient temperatures as well as 50° C. and 100° C. (Table I).

EXAMPLE 14

Polymer A was cast into a film on cold rolled steel panels without adding any diamine and was baked at 100° C. for 20 minutes. As can be seen from Table I no cure was observed even after allowing the panels to age up to 60 days at room temperature.

EXAMPLE 15

To 15 parts Polymer C was added 11.4 parts of ethyl acetate and 2.3 parts of 1,6-hexamethylenediamine. This blend was cast into films on cold rolled steel panels and baked at 100° C. for 20 minutes. As can be seen from Table I the cure of the coating continued after the initial bake to produce excellent solvent resistance.

EXAMPLE 16

Following the procedures of Examples 11 to 15 additional coatings are prepared from the polymers of Example 10.

TABLE I

PROPERTIES OF COATINGS CURED BY ACE MONOMERS

| Example | Gel Effect Point (min.) | Initial Cure Conditions | Film Properties | | | Post Cure | | | Post Cure | | |
|---|---|---|---|---|---|---|---|---|---|---|---|
| | | | Thick | Khn | MEK Rubs | Days At RT | Khn | MEK Rubs | Days At RT | Khn | MEK Rubs |
| 11 | 112 | ambient; 24 hrs. | 1.0 | 3 | 2 | | | | 30 | 11.4 | 200+ |
| 12 | 15 | ambient; 24 hrs. | 1.5 | 5.7 | 30 | 5 | 8.0 | 80 | | 12.1 | 200+ |
| 13 | 20 | ambient; 24 hrs. | 1.5 | | | 1 | 1 | 200+ | 14 | 10.6 | 200+ |
| | | 50° C., 20 min. | 1.2 | 2 | 200+ | 5 | 4.6 | 200+ | 14 | 10.5 | 200+ |
| | | 100° C., 20 min. | 0.9 | 12.8 | 200+ | 5 | 13.1 | 200+ | 14 | 14.2 | 200+ |
| 14 | — | 100° C., 20 min. | 1.0 | 0 | 2 | | | | 60 | | 2 |
| 15 | 2400 | 100° C., 20 min. | 2.0 | | 55 | 5 | 4.9 | 200+ | 14 | 8.2 | 200+ |

Note:
Khn = Knoop Takon Hardness
Thick = thickness of films in mils.

EXAMPLE 17

Preparation of Ethyl N-2-ethyloxamatoacrylate

To a mixture of 500 parts ethanolamine in methylene chloride (900 ml), cooled to −70° C., was added dropwise 2405 parts diethyloxalate. After stirring at room temperature for 16 hours, the mixture was filtered, concentrated and purified by chromatography to yield pure ethyl 2-hydroxyethyloxamate. A mixture of the oxamate (77 parts), sodium carbonate (50.2 parts) and an inhibitor in chloroform were cooled to 0° C. and acryloylchloride (43.3 parts) was added dropwise. After stirring at 0° C. for 2 hours and room temperature for 3 hours the mixture was filtered to yield 1011 parts crude ethyl N-2-ethyloxamatoacrylate.

EXAMPLE 18

Preparation of Polymer from Ethyl N-2-ethyloxamatoacrylate

One part ethyl N-2-ethyloxamatoacrylate of Example 17 was mixed with 2 parts dioxane and 0.005 azobisisobutyronitrile and was purged with nitrogen. The mixture was heated to 70° C. for 60 minutes and the homopolymer was formed. Four tenths part 1,3-diaminopropane was added to cure the polymer after it had cooled. There was an immediate evolution of heat and the sample solidified indicating rapid crosslinking.

EXAMPLE 19

Preparation of N-isopropyl-N-ethyl oxalyl-3-aminopropyl methacrylamide (EOMAM)

Sixty-six parts of isopropylaminopropylmethacrylamide was mixed with 400 parts chloroform and 36.4 parts triethylamine. The mixture was cooled to 4° C. and a mixture of ethyl oxalyl chloride (49 parts) in chloroform (100 parts) was added dropwise over 35–45 minutes. The mixture was held at 0°–5° C. for ½ hour and then warmed to room temperature overnight. The mixture was filtered, stripped and purified by column chromatography to yield N-isopropyl-N-ethyl oxalyl-3-aminopropylmethacrylamide (99.6 parts). The product was confirmed by chemical analysis.

EXAMPLE 20

Preparation of polymer from N-isopropyl-N-ethyloxalyl-3-aminopropylmethacrylamide (EOMAM)

The polymerization of Example 7 was repeated with the following reactants:

| | |
|---|---|
| Butyl acrylate | 25 |
| Methyl Methacrylate | 30 |
| EOMAM (from Example 19) | 45 |

The resulting polymer (5 parts) was gelled by 1,3-propylene diamine (0.15 parts) within 18 hours or 1,6-hexamethylenediamine (0.23 parts) after 45 hours at room temperature.

EXAMPLE 21

Preparation of Methyl acrylamidoglycolate (MAG)

Acrylamide (141.7 parts), methylglyoxylate (144 parts), acetone (1200 ml) and phenothiazine (0.05 parts) were mixed and heated to reflux for 6 hours. After filtration and crystallization 180 parts MAG were received as confirmed by chemical analysis.

EXAMPLE 22

Preparation of polymer from Methylacrylamidoglycolate

The procedure of Example 7 was repeated with the following monomers:

| | |
|---|---|
| Butyl acrylate | 7.5 parts |
| Methyl methacrylate | 11.8 parts |
| MAG (from Example 21) | 5.75 parts |

The polymer (15 parts) was readily gelled using 1,3-diaminopropane (0.39 parts) within 7–10 minutes at room temperature indicating rapid crosslinking.

EXAMPLE 23

Preparation of N-Ethyl oxalyl-N'-methylene aminoacrylamide

Methoxymethyl acrylamide (19.7 parts), ethyl oxamate (40 parts), sulfuric acid (2 parts), methanol (10.9 parts) and chloroform (350 ml.) were mixed and refluxed for 32 hours. Excess sodium carbonate was added and the mixture was stirred for 3 days. Filtration, stripping, and fractional crystallization yielded 16 parts of the desired product as confirmed by chemical analysis.

EXAMPLE 24

Preparation of N-Ethyl oxalylacrylamide and N,N-Bis(ethyl oxalylacrylamide)

The above monomers are jointly prepared by the condensation reaction of acrylamide with diethyl oxalate or ethyl oxalyl chloride in the presence of potassium tertiary butoxide. The mixture is stirred at room temperature for 1–5 days and the mixed product is purified and each component is separated by chromatography or the mixed product is used to make a polymeric coating.

What is claimed is:

1. An alkyl acrylamidoglycolate alkyl ether wherein the alkyl groups are the same or different and have 1–8 carbon atoms.

2. The compound of claim 1 selected from the group consisting of methyl acrylamidoglycolate methyl ether, ethyl acrylamidoglycolate ethyl ether, and butyl acrylamidoglycolate butyl ether.

3. Acrylamidoglycolic acid alkyl ether wherein the alkyl group containing 1–8 carbon atoms.

* * * * *